(12) United States Patent
Ruckart

(10) Patent No.: US 7,746,996 B1
(45) Date of Patent: Jun. 29, 2010

(54) TELEPHONE HOLD FEATURE

(75) Inventor: John P. Ruckart, Atlanta, GA (US)

(73) Assignee: AT&T Intellectual Property, I,L.P., Reno, NV (US)

( * ) Notice: Subject to any disclaimer, the term of this patent is extended or adjusted under 35 U.S.C. 154(b) by 573 days.

(21) Appl. No.: 10/086,338

(22) Filed: Mar. 1, 2002

(51) Int. Cl.
*H04M 3/42* (2006.01)

(52) U.S. Cl. ............... 379/211.01; 379/70; 455/417

(58) Field of Classification Search ........... 379/88.13, 379/211.02, 67, 88.17, 201.01, 76, 74, 70, 379/211.01, 213.01; 455/412, 553, 413, 455/506, 567, 418, 419, 417
See application file for complete search history.

(56) References Cited

U.S. PATENT DOCUMENTS

| | | | | | |
|---|---|---|---|---|---|
| 4,266,098 | A | * | 5/1981 | Novak | 379/77 |
| 5,329,578 | A | * | 7/1994 | Brennan et al. | 379/211.03 |
| 5,438,568 | A | | 8/1995 | Weisser, Jr. | |
| 5,533,102 | A | * | 7/1996 | Robinson et al. | 379/88.25 |
| 5,548,636 | A | * | 8/1996 | Bannister et al. | 379/390.01 |
| 5,559,860 | A | * | 9/1996 | Mizikovsky | 455/413 |
| 5,652,789 | A | * | 7/1997 | Miner et al. | 379/201.01 |
| 5,754,627 | A | * | 5/1998 | Butler et al. | 455/414.1 |
| 5,978,451 | A | * | 11/1999 | Swan et al. | 379/88.24 |
| 6,005,870 | A | * | 12/1999 | Leung et al. | 370/466 |
| 6,011,845 | A | * | 1/2000 | Nabkel et al. | 379/266.01 |
| 6,122,348 | A | * | 9/2000 | French-St. George et al. | 379/88.23 |
| 6,377,795 | B1 | * | 4/2002 | Bach et al. | 455/417 |
| 6,393,272 | B1 | * | 5/2002 | Cannon et al. | 455/413 |
| 6,408,177 | B1 | * | 6/2002 | Parikh et al. | 455/414.4 |
| 6,415,020 | B1 | * | 7/2002 | Pinard et al. | 379/88.11 |
| 6,418,309 | B1 | * | 7/2002 | Moon et al. | 455/418 |
| 6,463,278 | B2 | * | 10/2002 | Kraft et al. | 455/418 |
| 6,484,027 | B1 | * | 11/2002 | Mauney et al. | 455/421 |
| 6,574,471 | B1 | * | 6/2003 | Rydbeck | 455/418 |
| 6,591,115 | B1 | * | 7/2003 | Chow et al. | 455/555 |
| 6,658,102 | B1 | * | 12/2003 | Van Amerongen | 379/201.02 |
| 6,668,049 | B1 | * | 12/2003 | Koch et al. | 379/211.02 |
| 6,760,581 | B2 | * | 7/2004 | Dutta | 455/414.1 |
| 6,763,105 | B1 | * | 7/2004 | Miura et al. | 379/373.01 |
| 6,782,252 | B1 | * | 8/2004 | Kang et al. | 379/80 |
| 7,324,812 | B2 | * | 1/2008 | Wegman | 455/416 |
| 7,379,455 | B2 | * | 5/2008 | Pickett | 370/389 |
| 2002/0042262 | A1 | * | 4/2002 | Aveling | 455/412 |
| 2002/0077157 | A1 | * | 6/2002 | Okun et al. | 455/567 |
| 2002/0137493 | A1 | * | 9/2002 | Dutta | 455/414 |
| 2002/0181671 | A1 | * | 12/2002 | Logan | 379/88.13 |
| 2003/0134662 | A1 | * | 7/2003 | Shah et al. | 455/560 |
| 2003/0153364 | A1 | * | 8/2003 | Osann, Jr. | 455/567 |
| 2004/0022381 | A1 | * | 2/2004 | Turner | 379/211.01 |
| 2004/0203632 | A1 | * | 10/2004 | Schaaf | 455/414.1 |
| 2004/0229600 | A1 | * | 11/2004 | Saez et al. | 455/417 |
| 2005/0147212 | A1 | * | 7/2005 | Benco et al. | 379/84 |
| 2007/0099651 | A1 | * | 5/2007 | Strasser | 455/550.1 |

* cited by examiner

*Primary Examiner*—Olisa Anwah
(74) *Attorney, Agent, or Firm*—Cantor Colburn LLP

(57) ABSTRACT

A telecommunications device. The device includes a receiver for receiving an incoming call and a processor in communication with the receiver. The processor has a call hold module for placing the call on hold prior to the call being answered by a user of the telecommunications device.

9 Claims, 5 Drawing Sheets

TELEPHONE HOLD FEATURE

BACKGROUND OF THE INVENTION

Telephones and other telecommunications devices have become pervasive in modern society. When a call is placed to a device, it may not always be convenient for the user of the device to answer the call immediately, even though the user desires to communicate with the calling party. For example, a user of a cellular telephone may receive a call while the user is in a place in which it is inconvenient to talk without disturbing others (e.g. in a business meeting or in a public theatre). The user may then either ignore the call or answer the call and ask the calling party to hold the line while the user retreats to a place where the user can take the call without disturbing others.

SUMMARY OF THE INVENTION

In one embodiment, the present invention is directed to telecommunications device. The device includes a receiver for receiving an incoming call and a processor in communication with the receiver. The processor has a call hold module for placing the call on hold prior to the call being answered by a user of the telecommunications device.

In another embodiment, the present invention is directed to a method of placing an incoming call to a telecommunications device from a calling party on hold prior to being answered by a called party. The method includes automatically answering the call and playing a message to the calling party. The method also includes connecting the called party to the calling party when the called party answers the call.

BRIEF DESCRIPTION OF THE DRAWINGS

Further advantages of the present invention may be better understood by referring to the following description taken in conjunction with the accompanying drawings, in which.

DETAILED DESCRIPTION OF PREFERRED EMBODIMENTS

It is to be understood that the figures and descriptions of the present invention have been simplified to illustrate elements that are relevant for a clear understanding of the present invention, while eliminating, for purposes of clarity, other elements of a conventional telecommunications network. For example, certain operating system details and modules of certain of the intelligent platforms of the network are not described herein. Those of ordinary skill in the art will recognize, however, that these and other elements may be desirable in a typical telecommunications network. However, because such elements are well known in the art, and because they do not facilitate a better understanding of the present invention, a discussion of such elements is not provided herein.

The term "calling party" is used herein generally to refer to the person or unit that initiates a telecommunication. The calling party may also be referred to herein as "caller." In some cases, the calling party may not be a person, but may be a device such as a facsimile machine, an answering service, a modem, etc. The terms "called party" and "user" are used herein generally to refer to the person or unit that answers or responds to the call or communication. The term "communication" is used herein to include all messages or calls that may be exchanged between a calling party and a called party, including voice, data and video messages. The term "communication" is used synonymously herein with the term "call" unless a distinction is noted. The term "subscriber" is used herein to generally refer to a subscriber of the described telecommunications service.

The present invention allows a user (i.e. a called party) of a telecommunications device to place an incoming call on hold prior to the user answering the call. The call may be placed on hold by the user pressing a key or button on the device or the call may be placed on hold automatically according to a pre-defined user setup. The hold function of the present invention may be performed partially or wholly by the device itself or partially or wholly by the telecommunications network to which the device is in communication therewith.

According to one embodiment, the system of the present invention utilizes the intelligent functionality of an Advanced Intelligent Network (AIN). The AIN is a network used in conjunction with a conventional telephone network, such as the public switched telephone network (PSTN), to provide enhanced voice and data services and dynamic routing capabilities using two different networks. The actual voice call is transmitted over a circuit-switched network, but the signaling is done on a separate packet-switched network. Before describing details of the system of the present invention, a description of the AIN is provided.

Figure 1:
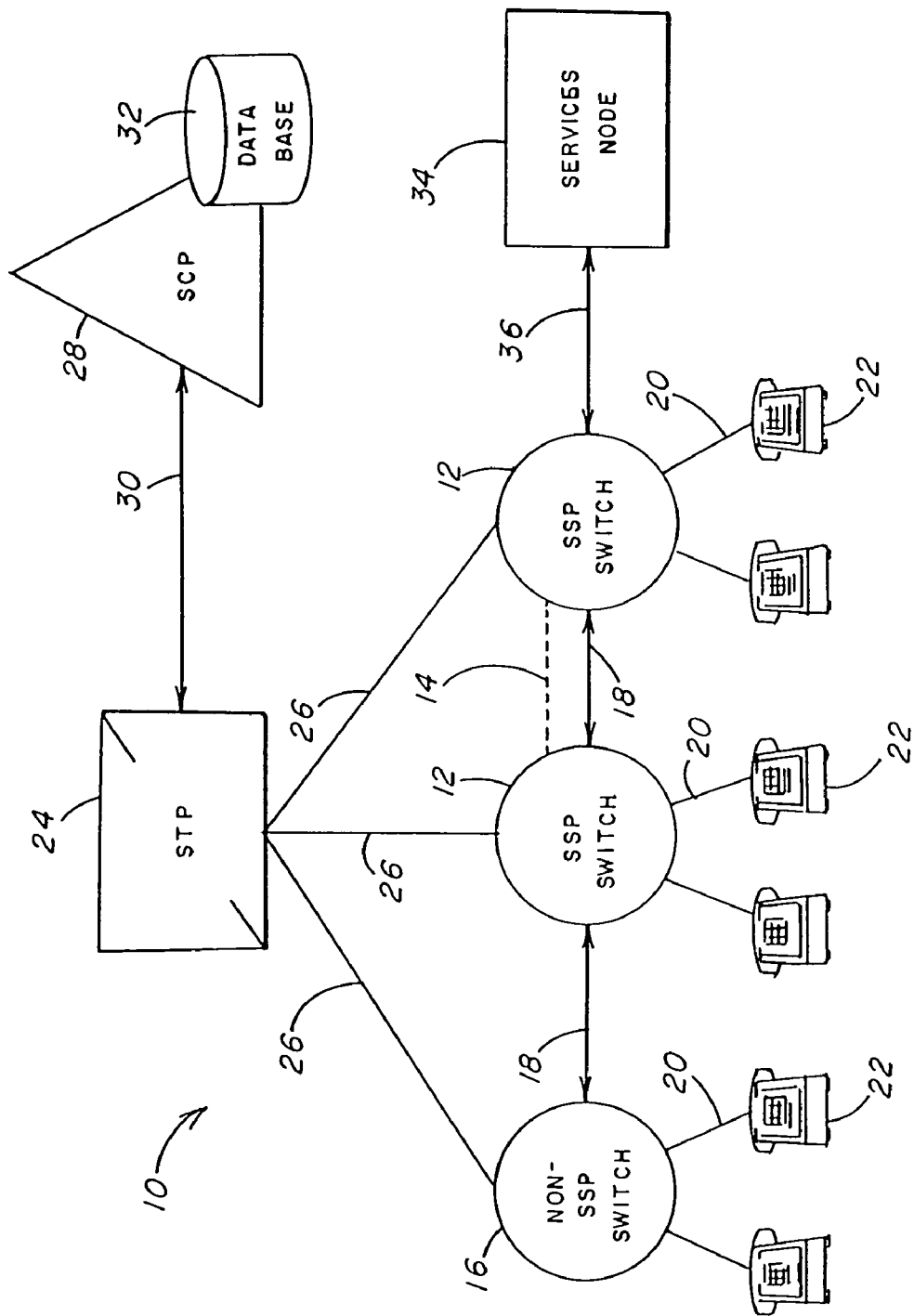
FIG. 1 is a block diagram of an Advanced Intelligent Network (AIN) for integration with a public switched telephone network.

FIG. 1 is a block diagram of an Advanced Intelligent Network (AIN) 10 for integration with the public switched telephone network (PSTN). The AIN 10 may be employed by a Local Exchange Carrier (LEC), and may be utilized by the LEC to allow the LEC to provide call processing features and services that are not embedded within conventional switching circuits of the PSTN.

A typical LEC includes a number of central office (CO) switches for interconnecting customer premises terminating equipment with the PSTN. For an LEC including the AIN 10 as illustrated in FIG. 1, the central office switches may be provided as Service Switching Points (SSP) switches 12. The dashed line 14 between the SSP switches 12 indicates that the number of SSP switches 12 in the AIN 10 may vary depending on the particular requirements of the AIN 10. The AIN 10 may also include a non-SSP switch 16. The difference between the SSP switches 12 and the non-SSP switch 16 is that the SSP switches 12 provide intelligent network functionality. Interconnecting the SSP switches 12 and the non-SSP switch 16 are communication links 18 which may be, for example, trunk circuits.

Each SSP switch 12 and non-SSP switch 16 has a number of subscriber lines 20 connected thereto. The subscriber lines 20 may be, for example, conventional twisted pair loop circuits connected between the switches 12, 16 and the telephone drops for the customer premises, or the subscriber lines 20 may be trunk circuits, such as T-1 trunk circuits. Typically, the number of subscriber lines 20 connected to each switch 12, 16 is on the order of ten thousand to one hundred thousand lines. Each of the subscriber lines 20 is connected to a terminating piece of customer premises equipment, represented in FIG. 1 by the landline telephones 22. Alternatively, the terminating equipment may be other types of telecommunications units such as, for example, a telecopier, a personal computer, a modem, or a private branch exchange (PBX) switching system.

For the AIN 10 illustrated in FIG. 1, each SSP switch 12 and the non-SSP switch 16 are connected to a signal transfer point (STP) 24 via a communication link 26. The communication link 26 may employ, for example, the SS7 switching protocol. The STP 24 may be a multi-port high speed packet switch that is programmed to respond to the routing information in the appropriate layer of the switching protocol, and route the data packets to their intended destination.

One of the intended destinations of the data packets from the STP 24 is a service control point (SCP) 28. The STP 24 is in communication with the SCP 28 via a communication link 30, which may also employ the SS7 switching protocol. The SCP 28 may be an intelligent database server such as, for example, an Intelligent Network Service Control Point available from Lucent Technologies Inc., Murray Hill, N.J., and may have associated with it a network database 32 for storing network data. The intelligent functionality of the SCP 28 may be realized by application programs, such as programmable Service Program Applications (SPA), which are run by the SCP 28. The SCP 28 is normally employed to implement high volume routing services, such as call forwarding and number portability translation and routing. In addition, another of the functions of the SCP 28 is hosting of the network database 32, which may store subscriber information, such as subscriber call management profiles, used in providing enhanced calling services.

The AIN 10 illustrated in FIG. 1 also includes a services node (SN) 34. The SN 34 may be, for example, a Compact Services Node (CSN) available from Lucent Technologies Inc., Murray Hill, N.J., although the SN 34 may be any other type of available AIN-compliant SN. The SN 34 may be connected to one or more of the SSP switches 12 via a communications link 36 which may be, for example, an Integrated Service Digital Network (ISDN), including BRI (Basic Rate Interface) or PRI (Primary Rate Interface) lines. According to other embodiments, the communications link 36 may be, for example, a T-1 trunk circuit.

The SN 34 may include an enunciator and may be used when some enhanced feature or service is needed that requires an audio connection to the call such as, for example, the call return and calling name services. Similar to the SCP 28, the intelligent functionality of the SN 34 may be realized by programmable applications executable by the SN 34.

In order to keep the processing of data and calls as simple as possible at the switches, such as at the SSP switches 12, a set of triggers may be defined at the SSP switches 12 for each call. A trigger in an AIN is an event associated with a particular subscriber line 20 that generates a data packet to be sent from the SSP switch 12 servicing the particular subscriber line 20 to the SCP 28 via the STP 24. The triggers may be originating triggers for calls originating from the subscriber premises or terminating triggers for calls terminating at the subscriber premises. A trigger causes a message in the form of a query to be sent from the SSP switch 12 to the SCP 28.

The SCP 28 in turn interrogates the database 32 to determine whether some customized call feature or enhanced service should be implemented for the particular call, or whether conventional dial-up telephone service should be provided. The results of the database inquiry are sent back from the SCP 28 to the SSP switch 12 via the STP 24. The return packet includes instructions to the SSP switch 12 as to how to process the call. The instructions may be to take some special action as a result of a customized calling service or enhanced feature. For example, for an enhanced calling feature requiring the capabilities of the SN 34, the return message from the SCP 28 may include instructions for the SSP switch 12 to route the call to the SN 34. In addition, the return message from the SCP 28 may simply be an indication that there is no entry in the database 32 that indicates anything other than conventional telephone service should be provided for the call. The query and return messages may be formatted, for example, according to conventional SS7 TCAP (Transaction Capabilities Application Part) formats. U.S. Pat. No. 5,438,568, which is incorporated herein by reference, discloses additional details regarding the functioning of an AIN.

The AIN 10 illustrated in FIG. 1 includes only one STP 24, one SCP 28, one network database 32, and one SN 34, although the AIN 10 may further include an additional number of these components as well as other network components which not are included in FIG. 1 for purposes of clarity. For example, the AIN 10 may additionally include redundant SCPs and STPs to take over if the STP 24 or the SCP 28 should fail. In addition, the AIN 10 may include an Automatic Electronic Switching System (AESS) Network Access Point (NAP) in communication with the STP 24, which may be programmed to detect the trigger conditions. Further, the AIN 10 may include regional STPs and regional SCPs in communication with, for example, the local STP 24, for routing and servicing calls between different LECs.

Figure 2:
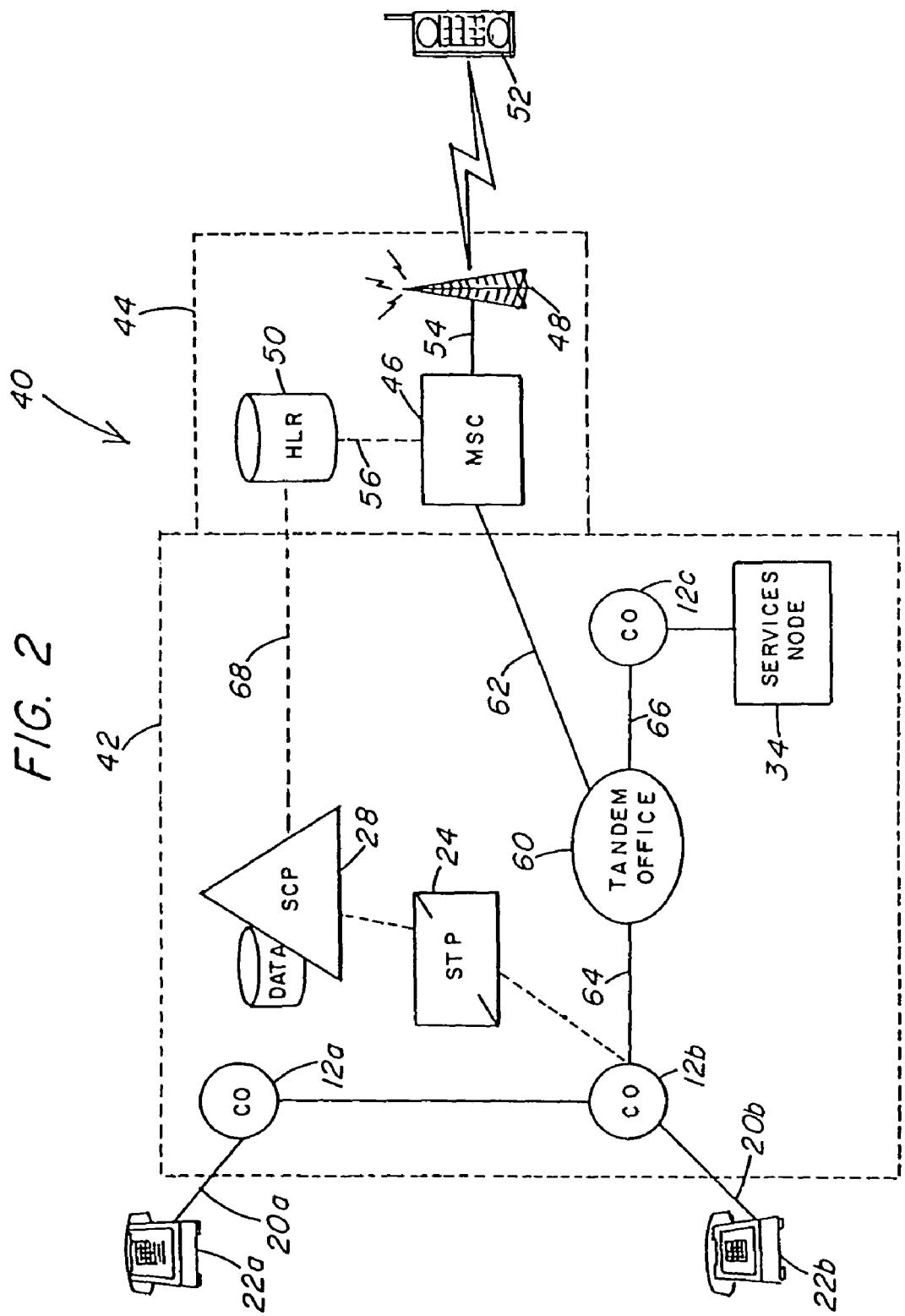
FIG. 2 is a block diagram of a system according to one embodiment of the present invention.

The present invention is directed, according to one embodiment, to a system for allowing a telecommunications device user to have an incoming call placed on hold prior to answering the call. FIG. 2 is a diagram of a system 40 according to one such embodiment. The system 40 includes a landline network 42 and a wireless network 44. The landline network 42 includes portions of an AIN as described in conjunction with FIG. 1, including the CO SSP switches 12a-c (designated as "CO" in FIG. 2 and referred to as "CO switch(es)" hereinafter), the STP 24, the SCP 28, and the SN 34. The landline telephones 22a, 22b are in communication with the switches 12a, 12b via subscriber lines 20a, 20b, respectively. For purposes of clarity, other elements of an AIN are not shown in FIG. 2.

The wireless network 44 includes a mobile switching center (MSC) 46, a base transceiver station (BTS) 48, and a home location register 50. The MSC 46 is in communication with a wireless telecommunications device 52, such as a wireless telephone as illustrated in FIG. 2, via the BTS 48. The BTS 48 may communicate with wireless telecommunications device 52 according to an air-interface communication scheme such as, for example, AMPS (ANSI-553), TDMA (IS-136), CDMA (IS-95), or GSM. The BTS 48 may be in communication with the MSC 46 via the communications link 54. The MSC 46 is an automatic switching system in a wireless telecommunications network that acts as the interface for subscriber traffic between the wireless network 44 and the landline network 42 or other MSCs in the same or other wireless networks. The MSC 46 performs the same general function as a central office switch in a landline based system. In addition, the MSC 46 supports incoming calls through a radio telecommunications front-end, as well as handoff and roaming functions. Accordingly, the MSC 46 may include wireless IN functionality for detecting originating and terminating triggers.

The MSC 46 may be in communication with the HLR 50 via a communications link 56 which may, for example, be an SS7 signaling protocol link. The HLR 50 is a location register to which the user identity of a wireless telecommunications unit, such as the wireless telephone 52, is assigned for record purposes. The HLR 50 may register subscriber information relating to wireless telecommunications devices such as, for example, profile information, current location, and authorization period. When the MSC 46 detects a wireless telecommunications unit entering the MSC's service area, the MSC 46 performs a registration process that includes requesting subscriber profile information from either the HLR 50 or a visitor location register (VLR) (not shown), depending upon whether the wireless telephone 52 is within its home location or within a visitor location. Typically for integrated wireless networks, the VLR assigned to the service area of a visiting wireless subscriber is updated with information from the HLR associated with the wireless subscriber's wireless service provider (WSP). Accordingly, the MSC 46 servicing a particular area has access to information regarding each of the wireless users presently in its service area.

The landline network 42 additionally includes a tandem office 60, which provides a switching interface between the landline network 42 and the wireless network 44. The tandem office 60 may be in communication with the MSC 46 via a communications link 62, which may be, for example, a trunk circuit or an ISDN. In addition, the tandem office 54 may be in communication with the CO switches (such as the CO switches 12b,c as illustrated in FIG. 2) via communications links 64, 66 respectively, which may be, for example, trunk circuits.

In addition, the SCP 28 may be in communication with the HLR 50 of the wireless network 44 via a communications link 68 employing, for example, the IS-41 signaling protocol.

For clarity in FIG. 2, communications links that are used exclusively for signaling (e.g., no call data) are illustrated with dashed lines, and communications links that transfer signaling and/or call data are illustrated with solid lines.

Figure 3:
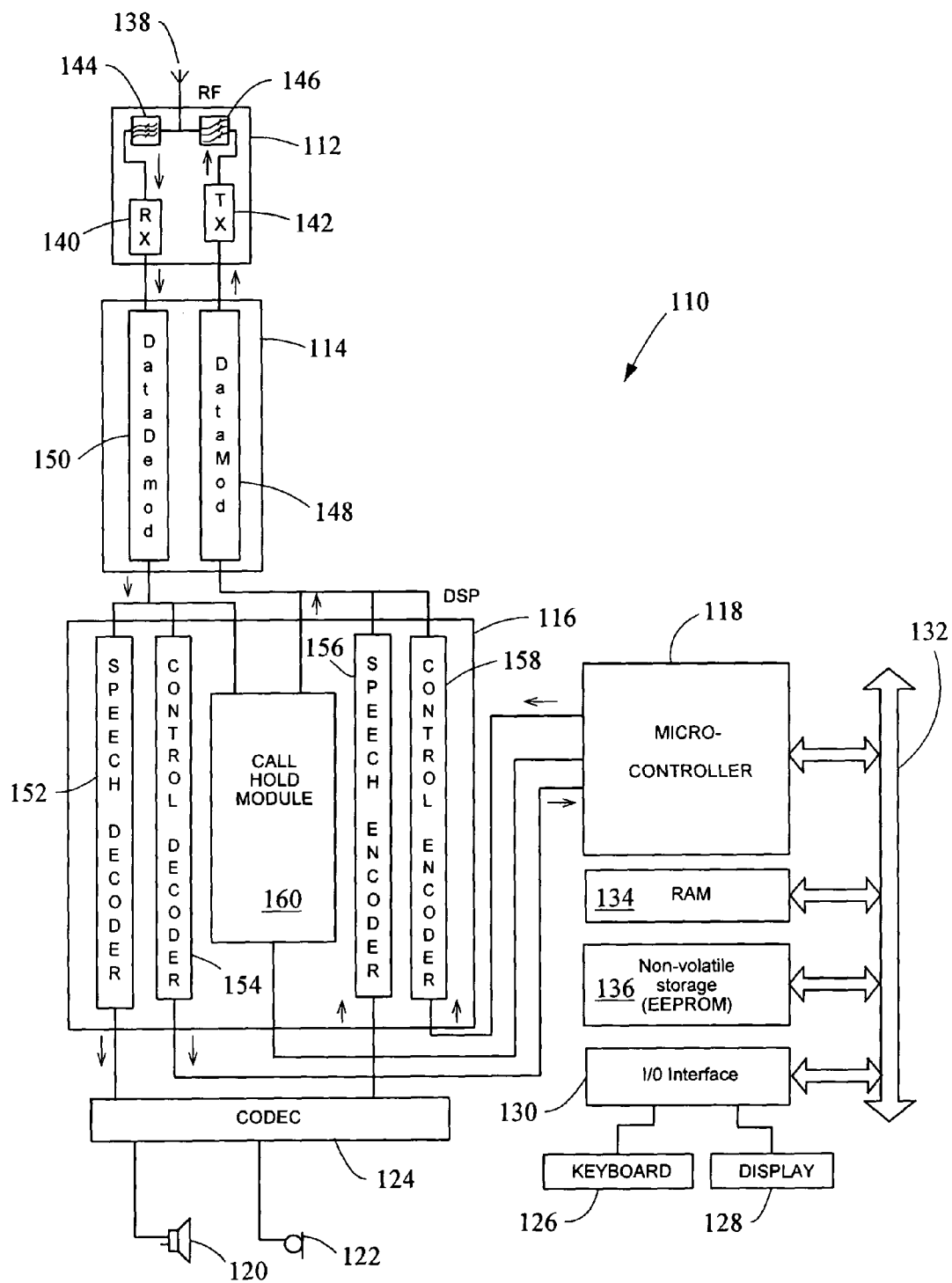
FIG. 3 is a block diagram of a telecommunications device according to one embodiment of the present invention.

FIG. 3 is a block diagram of a telecommunications device 110 according to one embodiment of the present invention. The telecommunications device 110 may be, for example, a digital wireless telephone (DWT) such as the telephone 52 that can function in a digital wireless communication system (e.g., a TDMA system or a CDMA system).

The DWT 110 illustrated in FIG. 3 includes an RF transceiver unit 112, a modulator-demodulator unit 114, a digital signal processor (DSP) 116, and a microcontroller 118. The DWT 110 also includes a speaker 120 and a microphone 122 connected to the DSP 116 via a CODEC (coder-decoder) unit 124. In addition, the DWT 110 includes a keyboard 126 and a display unit 128. The keyboard 126 and the display unit 128 may interface with the microcontroller 118 via an I/O interface 130. The I/O interface 130 may communicate with the microcontroller 118 via a bi-directional bus 132. The DWT 110 may also include memory units such as, for example, a RAM unit 134 and a non-volatile memory unit 136. The memory units 134, 136 may be in communication with the microcontroller 118 via the bi-directional data bus 132. The non-volatile memory unit 136 may be, for example, an EEPROM. According to other embodiments, the DWT 110 may include other types of memory units such as, for example, ROM or flash memory.

The RF transceiver unit 112 may include an RF antenna 138, an RF receiver amplifier 140, and an RF transmitter amplifier 142. The RF transceiver unit 112 may also include a pair of band pass filters, a receiver filter 144 and a transmitter filter 146, to filter out signals outside of the receive and transmit frequency ranges, respectively. The RF transceiver unit 112 may establish a telephone communication over one or more RF channels.

The modulator-demodulator unit 114 may include a data modulator 148 and a data demodulator 150. The data demodulator 150 may demodulate voice and control channel bits received by the RF transceiver unit 112, as described further hereinbelow. The data modulator 148 may modulate voice and control channel bits to be transmitted by the RF transceiver unit 114, as discussed further hereinbelow.

The microcontroller 118 may include a number of logic units or circuit elements (not shown) such as a bus control logic unit and a control information processing unit, as well as one or more temporary storage registers or buffers. Among other things, the microcontroller 118 may interpret keyboard entries entered on the keyboard 126 and received via the I/O interface 130. Further, the microcontroller 118 may control the display of information on the display 128 via the I/O interface 130.

The DSP 116 may include a number of modules, such as a speech decoder module 152, a control decoder module 154, a speech encoder module 156, a control encoder module 158, and a call hold module 160. The modules 152, 154, 156, 158, 160 may be implemented using any type of computer instruction type, such as microcode, and may be stored in, for example, one of the memory units 134, 136, or can be configured into the logic of the DSP 116.

The decoder units, i.e., the speech decoder module 152 and the control decoder module 154, may receive demodulated bit streams from the data demodulator 150. The speech decoder module 152 may supply its output to the CODEC unit 124, and the control decoder module 154 may supply its output to the microcontroller 118 for further processing. The encoder units, i.e., the speech encoder module 156 and the control encoder module 158 may supply their respective outputs to the data modulator unit 148. The speech encoder module 156 may receive encoded speech from the CODEC unit 124, and the control encoder unit 158 may receive transmit control information from the microcontroller 118.

The operation of the call hold module 160 is described in more detail hereinbelow in connection with FIG. 5.

The DWT 110 enters into a conversation mode when a voice channel is assigned to it by a base station 48 of the wireless network 44. The analog speech signal from the microphone 112 is first converted into a digital format, e.g., a PCM (pulse code modulation) format, by the CODEC unit 124. The speech encoder module 156 of the DSP 116 may then divide the digital output from the CODEC unit 124 into appropriate time slots and then encode each group of bits. The encoding by the speech encoder 156 may also compress the size of each group of data bits. The DSP 116 may encode via the control encoder 158 any control channel information (including any DTMF audio signaling tones to be transmitted over the digital voice channel) received from the microcontroller 118, and add the encoded control bits to the appropriate group of encoded data bits from the speech encoder 156. The DSP 110 (for example, through the speech encoder module 156) may also add error protection to some of the voice data bits. The combined digital control and voice data bits may then be modulated by the data modulator 148. According to one embodiment, the data modulator 148 is a differential quadrature phase shift keying (DQPSK) modulator. The modulated digital voice and control channel bits may then be transmitted via the RF transceiver unit 112 after amplification by the RF transmitted amplifier 142 and filtering by the transmitter filter 146.

Digital voice and control channel information received by the RF antenna 138 may first be filtered by the receiver filter 144 and amplified by the RF receiver amplifier 140. Thereafter, the data demodulator 150 of the modulator-demodulator unit 114 may demodulate the received voice and control channel bits using, for example, DQPSK demodulation. The DSP 116 receives the demodulated digital voice and control channel bits from the data demodulator 150 and removes the encoding present therein with the speech decoder module 152 and the control decoder module 154 respectively. The decoded control bits may be sent to the microcontroller 118 for further processing. However, the decoded voice bits may be sent to the CODEC unit 124 to reconstruct the analog audio information received through the digital voice bits. The user of the DWT 110 may then listen to the received audio through the speaker 120.

Figure 4:
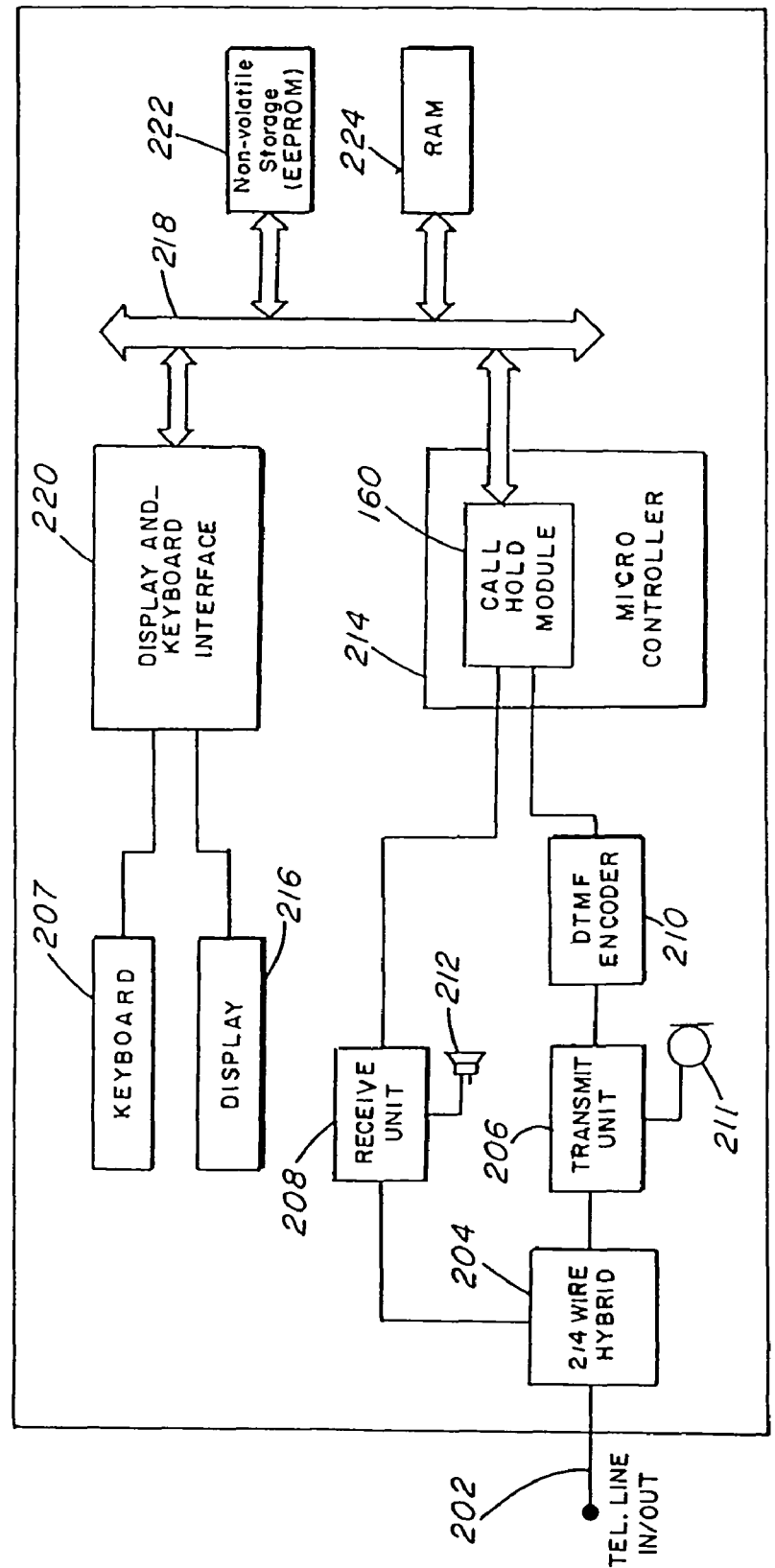
FIG. 4 is a block diagram of a telecommunications device according to another embodiment of the present invention.

The present invention may also be implemented in a wireline telephone, such as the telephone 22. FIG. 4 is a block diagram of a wireline telephone (WLT) 200 according to one such embodiment. The WLT 200 is connected to a telephone line 202 that, in turn, connects the WLT 200 to a telephone switching office as a part of a subscriber loop. The WLT 200 may include a two-to-four wire hybrid (2/4 wire hybrid) 204 that splits the telephone signals in a two-wire system within the WLT 200 into a four-wire system supported by the telephone switching office.

The WLT 200 may include a transmit unit 206 and a receive unit 208. The transmit unit 206 is connected to the telephone line 202 via the hybrid 204, and may include a pulse/tone dialer (not shown) to transmit digits (and/or symbols) dialed by the user with a keyboard 207. The WLT 200 may also include a DTMF (dual tone multi-frequency) encoder 210 to encode digits (and/or symbols) dialed by the user into corresponding DTMF audio tones before they are sent over the telephone line 202 by the tone dialer of the transmit unit 206. The transmit unit 206 may transmit voice received by a microphone 211 over the outgoing telephone line 202. The receiver unit 208 may also be connected to the telephone line 202 via the hybrid 204. A speaker 212 may be connected to the receive unit 208 to provide the user a means to listen to the conversation.

A display 216 provides a visual interface for the user of the WLT 200. Both the keyboard 207 and the display 216 are in communication with a bi-directional bus 218 via an interface 220. the WLT 200 also includes a non-volatile storage 222 and a volatile storage, such as a RAM 224. According to one embodiment, a microcontroller 214 may include the call hold module 160.

Figure 5:
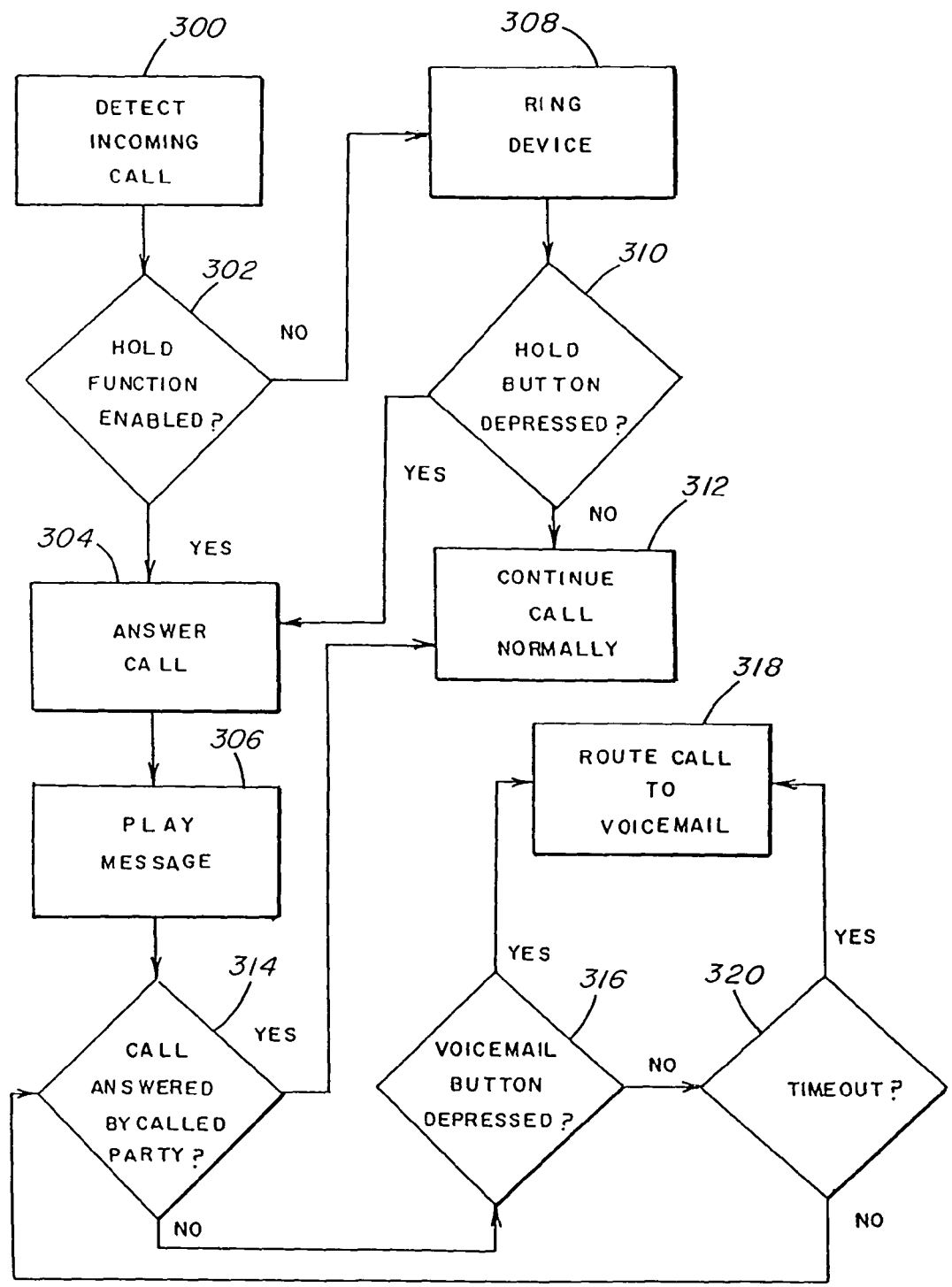
FIG. 5 is a flowchart illustrating an embodiment of a process performed by a telecommunications device according to the present invention.

FIG. 5 is a flowchart illustrating an embodiment of a process performed by a telecommunications device, such as the DWT 110 or the WLT 200, according to the present invention. Some or all of the illustrated process can be performed by, for example, the call hold module 160. At step 300, the device detects an incoming call. At step 302, it is determined if the user of the device (i.e. the called party) has enabled the call hold function. If the user has enabled the function, the device answers the call at step 304 and plays a message to the calling party at step 306. An example of such a message could be, "Hello, this is Joe Smith, I am unable to answer the telephone at the moment, so you have been placed on hold. I will answer your call momentarily." The message played at step 304 may be a message that is stored on the device or may be a message played by, for example, the SN 34. A message may also be displayed on the device that alerts the user of the device that a call has been placed on hold. Such a message could be, for example, "123-456-7890 Has Been Placed On Hold".

If the hold function is not enabled as determined at step 302, the device alerts the user that a call is incoming at step 308 by, for example, an audible ring, a vibration, and/or a message or flashing light generated on the device's display. After alerting the user of the incoming call, the device determines, at step 310 whether the user desires to place the call on hold prior to answering. The device may do so by determining whether a button or a key on the device is depressed by the user during a specified period of time. The period of time may be, for example, the period between the first and second times (e.g. rings) that the device alerts the user of the incoming call. The button or key that the user may press to place the call on hold may be, for example, a predetermined key on the keyboard of the device or a dedicated call hold button. If the user does not press a button or a key to place the call on hold, the call is processed normally starting at step 312.

If a button depression is detected at step 310 within the prescribed time period, the process continues to step 304 where the device answers the call and plays a message at step 306. At step 314, the device determines if the call has been answered by the user (i.e. the device goes off-hook or the connection button is depressed). If the call is answered, the call is continued normally at step 312. If the call has not been answered, the device determines if a predetermined button or a key on the device is depressed by the user at step 316. The button or key is depressed if the user desires to send the calling party to voicemail. If the predetermined button or key is depressed, the call is routed to voicemail at step 318 using conventional techniques.

If the predetermined button or key is not depressed, the device determines if the calling party has been placed on hold for more than a predetermined period of time (e.g. 30 seconds) at step 320. If the calling party has been on hold for more than the predetermined time, the call is routed to voicemail using conventional techniques at step 318. If the calling party has not been on hold for more than the predetermined time period, the process continues until the call is answered at step 314, the user places the calling party in voicemail at step 316, or the wait period times out at step 320.

According to one embodiment of the invention, the user of the device enables the call hold function using a menu that is displayed to the user of the device. The menu may enable the user to, for example, select the message that is to be played to the calling party at step 306, the keyboard button that is to be used to place a call on hold and/or direct a held call into voicemail (steps 310 and 316), a predetermined time period during which the hold function is enabled, and the maximum amount of time that the calling party can be placed on hold prior to the call being directed to voicemail (step 320).

In one embodiment of the invention, the user of the device may enable the hold function by instructing the SN 34 to place all incoming calls on hold and play a message to the calling party while alerting the user of the device that the device has an incoming call. The user may enable the hold function by, for example, using DTMF codes (e.g. dialing a star (*) code), telephoning an integrated voice response system (IVRS) and enabling the function and defining its parameters, enabling the function and defining its parameters via a computer web interface, or by communicating the times for the hold function to be active by interfacing with a scheduling program such as, for example, Microsoft Outlook®. The hold function and the handling of the call can be thus directed by the SN 34 (i.e. the process of FIG. 5 is performed using AIN functionality rather than functionality of the device). In such a case, the hold function may be provided as a subscriber service by a telecommunications provider.

It can be understood by those skilled in the art that there are many variations of the process illustrated in FIG. 5. For example, the device may include only the functionality to allow the user of the device to place an incoming call on hold by pressing a button or key rather than by enabling the hold function prior to receipt of an incoming call. Conversely, the device may only include functionality to allow the user to place an incoming call on hold and have no functionality to allow the user to press a button or key to place the call on hold. Also, the user may configure the device to only place calls from predetermined callers on hold while routing other callers to voicemail or allowing other callers to ring through, thus bypassing the hold function.

While several embodiments of the invention have been described, it should be apparent, however, that various modifications, alterations and adaptations to those embodiments may occur to persons skilled in the art with the attainment of some or all of the advantages of the present invention. It is therefore intended to cover all such modifications, alterations and adaptations without departing from the scope and spirit of the present invention as defined by the appended claims.

What is claimed is:

1. A telecommunications system, comprising:
   a home location register for storing a profile of a user of a telecommunications device, wherein the profile includes an indication of whether the user is a subscriber to an incoming call hold service implemented by the telecommunications system;
   a services node for:
   determining whether an incoming call placed to the telecommunications device by a calling party should be placed on hold prior to the call being answered by the user of the telecommunications device according to the incoming call hold service if the hold function is enabled, the determining based on a user input predetermined time period during which the incoming call is placed on hold, and a list including at least one predetermined potential calling party from whom incoming calls are placed on hold, the user input predetermined time period during which the incoming call is placed on hold being obtained by interfacing with a scheduling program;
   placing the incoming call on hold prior to the call being answered, the placing the call on hold being performed without input from the called party at the time of the call;
   if the incoming call is not to be placed on hold based on the incoming call hold service, directly ringing a called party device if the hold function is not enabled;
   determining whether the called party has pressed a button on the telecommunications device to enable a hold function
   playing a message to the calling party that the call has been placed on hold; and
   connecting the telecommunications device to the calling party if the user of the telecommunications device answers the incoming call; and
   a mobile switching center for facilitating communication between the telecommunications device, the services node, and the home location register.

2. The system of claim 1, wherein the services node determines whether the called party has enabled a hold function.

3. The system of claim 1, wherein the services node initiates alerting the called party of the incoming call.

4. The system of claim 1, wherein the services node initiates connecting the calling party to a voicemail system when the called party does not answer the call within a predetermined time period.

5. The system of claim 1, wherein playing the message to the calling party includes playing the message that is resident on the services node of a telecommunications network.

6. The system of claim 1, wherein playing the message to the calling party includes playing a pre-recorded message stored in a memory device resident on the telecommunications device.

7. The system of claim 1, wherein the services node initiates connecting the call to a voicemail system when the called party presses a button on the telecommunications device.

8. The system of claim 1, wherein the services node includes an enunciator.

9. The system of claim 8, wherein the enunciator is for playing a message to a calling party when a call is placed on hold.

* * * * *